United States Patent
Haldar et al.

(10) Patent No.: US 8,234,335 B1
(45) Date of Patent: Jul. 31, 2012

(54) CUSTOMIZED GROUPING OF PARTICIPANTS IN REAL-TIME CONFERENCE SET-UP

(75) Inventors: Debashis Haldar, Olathe, KS (US); Tong Zhou, Overland Park, KS (US)

(73) Assignee: Sprint Spectrum L.P., Overland Park, KS (US)

(*) Notice: Subject to any disclaimer, the term of this patent is extended or adjusted under 35 U.S.C. 154(b) by 2710 days.

(21) Appl. No.: 10/881,945

(22) Filed: Jun. 29, 2004

(51) Int. Cl.
 *G06F 15/16* (2006.01)
(52) U.S. Cl. .......................... 709/204; 709/205; 709/206
(58) Field of Classification Search .................. 709/204, 709/205, 206
See application file for complete search history.

(56) References Cited

U.S. PATENT DOCUMENTS

| | | | |
|---|---|---|---|
| 6,477,387 B1 | 11/2002 | Jackson et al. | 455/519 |
| 6,757,732 B1 * | 6/2004 | Sollee et al. | 709/227 |
| 6,873,854 B2 * | 3/2005 | Crockett et al. | 455/518 |
| 6,898,436 B2 * | 5/2005 | Crockett et al. | 455/518 |
| 7,197,300 B2 * | 3/2007 | Kushita | 455/418 |
| 7,206,809 B2 * | 4/2007 | Ludwig et al. | 709/204 |
| 7,236,580 B1 * | 6/2007 | Sarkar et al. | 379/202.01 |
| 2004/0003041 A1 * | 1/2004 | Moore et al. | 709/204 |

OTHER PUBLICATIONS

M. Handley et al., *SIP: Session Initiation Protocol*, Internet Engineering Task Force (IETF) Request for Comments (RFC) 2543, pp. 1-20, Mar. 1999.
J. Rosenberg et al., *SIP: Session Initiation Protocol*, Internet Engineering Task Force (IETF) Request for Comments (RFC) 3261, pp. 1-18; 152-163, Jun. 2002.

* cited by examiner

*Primary Examiner* — Djenane Bayard
*Assistant Examiner* — Umar Cheema (57) ABSTRACT

A customized list of real-time conference participants are obtained by selecting a conference group and then selecting members of the group to be excluded using an exclusion list feature. In alternative embodiments, one or more logical operators such as AND or OR are selected and applied to conference groups the user has selected. The logical operators and selected conference groups are sent to a conference server, which applies the operator to the selected groups to arrive at a shortlist of conference participants. The invention is particularly useful for cellular telephones initiating a real-time conference using the Session Initiation Protocol (SIP) and a SIP server resident on a network.

9 Claims, 6 Drawing Sheets

CUSTOMIZED GROUPING OF PARTICIPANTS IN REAL-TIME CONFERENCE SET-UP

BACKGROUND

This invention relates generally to real time telephone conferencing with a group of participants, and more particularly to new and convenient methods of selecting a specific, customized group of participants for a particular conference from a set of one or more previously defined and existing groups. The pre-defined groups could be personally defined groups (e.g., a group of business associates or relatives of the user); alternatively the groups could be defined by some other entity, such as the user's employer.

In current practice, a user of a client station, e.g., a mobile phone or other station, can initiate a real-time media session with a group of one or more parties with the aid of a conference server. A widely known and used protocol enabling this communication is the Session Initiation Protocol (SIP), reflected in Internet Engineering Task Force RFC 3261, the contents of which are incorporated by reference herein. Other protocols could be used, including modifications to the Simple Mail Transfer Protocol (SMTP).

Generally speaking, the process of initiating such a session involves the initiating user selecting a conference group (also known as a Push-to-Talk (PTT) or "buddy" group) from a menu or listing on the user's station and directing the initiating station to initiate the session. The user's station could be a cellular telephone or other telephone device equipped with real time conferencing software. The initiating station would then send an invitation message (such as SIP INVITE message) to a SIP conference server, requesting initiation of the session with the members of the conference group. The initiation request provides a group-identifier, which the conference server translates into a list of group members, by reference to a group database. The conference server then (i) engages in additional signaling with the initiating station to establish a real-time media session, e.g., an RTP session, with the initiating station; (ii) engages in signaling with each participant station in the conference group to establish a real-time media session with each participant station, and (iii) bridges the sessions together to allow the parties to communicate with each other. In some instances, the bridged communication is a half-duplex mode in which just one party can "have the floor" and speak at a time without clipping or over-riding other speakers. Conventional SIP signaling is used to set up each conference leg.

In current practice, there is no way to de-select a few (e.g., one or two) members from the conference group list for a particular session, without permanently deleting them from the group. In other words, if the user does not want to include an entire pre-selected group, but rather the entire group minus one person, they would have to individually select and enter the persons they wish to join into the conference. This process becomes quite cumbersome if the group is a large one. The art has lacked a more flexible method for customized grouping of conference participants.

SUMMARY OF THE INVENTION

The present invention is related to methods and apparatus for initiating a real-time conference between a telephone device operated by conference initiator and one or more remotely-located participants. As noted earlier, the present invention provides more convenient methods for grouping or selecting conference participants, where the list of intended conference participants does not fall exactly within a pre-defined conference group, e.g., one or more persons is to be deleted from a predefined group, or where the intended participants are found in two or more groups.

The preferred embodiments provide for two different methods for selecting and initiating a conference with the intended participants. A first method uses exclusion lists, in which the user designates a predetermined conference group and then specifies particular members of the group to be deleted from the group.

Thus, in a first aspect of the invention, a method for initiating a conference includes a step of generating, at the telephone device of a conference initiator, an invitation message, wherein said invitation message identifies a group of one or more participants to participate in the conference, e.g. a group either predefined by the conference initiator personally or by the conference initiator's employer; including in the invitation message an exclusion list comprising an identification of one or more of the participants of the group to be excluded from the conference; and transmitting the invitation message from the telephone device to a conference server. The conference server responsively initiates the conference with the group of one or more participants minus the participants in the exclusion list.

In a related aspect, an improvement to a telephone providing for real-time conferencing with a group of participants is provided. The improvement comprises providing in the telephone software instructions for generating a conference invitation message for initiation of a conference (e.g., a SIP INVITE message), wherein the conference invitation message comprises a) an identification of a predetermined group of participants to participate in the conference and b) an exclusion list identifying at least one member of the group to be excluded from the conference.

A second method for initiating a conference call with a desired set of participants uses logical operators and selections of two or more conference groups. In the second method, the conference initiator would select on their telephone a first conference group and a second conference group, and a logical operator such as AND or OR. The telephone includes software that generates a conference initiation message and sends the conference group selections and the logical operator to a conference server. Software resident in a conference server then performs a logical operation on the selected groups using the logical operator to arrive at a new list of conference participants ("shortlist" herein). For example, if the user selected conference group 1, the OR operator, and conference group 2, the resulting list of participants would consists of the members of either group 1 or group 2. Additional conference groups and logical operators could also be used to define a set of persons to initiate the conference with. In alternative embodiments the logical operation could be performed locally on the telephone and only the identification of the intended participants sent to the conference server.

In preferred embodiments, the selected group(s), logical operator(s), and/or exclusion list, are included in an invitation message (such as a SIP INVITE message) and sent to a conference server. In preferred embodiments, the conference server includes software that initiates a conference between the conference initiator telephone and the desired participants.

Thus, in this second aspect, a method is provided for initiating a real-time conference between a telephone device operated by conference initiator and one or more remotely located participants, comprising the steps of: selecting a first predefined group of participants; selecting a logical operator;

and selecting a second predefined group of participants; wherein the steps of selecting are performed on the telephone device, and transmitting the invitation message from the telephone device to a conference server. The invitation message includes the selected first and second groups and the logical operator. The conference server responsively initiates a conference between the conference initiator telephone device and the participants which result from the logical operator operating on the first and second predefined groups.

In a related aspect, an improvement to a telephone providing for real-time conferencing with a group of participants is provided, the improvement comprising providing in the telephone software instructions for generating a conference invitation message for initiation of a conference. The instructions include a) instructions for prompting a user to enter an identification of a first predetermined group of participants to participate in the conference; b) instructions for prompting the user to enter a selection of a logical operator and; c) instructions for prompting the user to select a second predetermined group of participants; and d) instructions for sending an invitation message to a conference server.

In still another aspect of the invention, a conference server is provided for real-time conferencing. The conference server includes an interface receiving an invitation message from a telephone. The invitation messages including a selection of a plurality of predetermined conference groups and at least one logical operator to be applied to the selection of conference groups. The conference server further includes executable logic for operating on the selection of conference groups using the at least one logical operator to thereby create a desired shortlist based on the selection of conference groups and the logical operator for the conference. The desired shortlist comprises a list of participants for the conference. The conference server further includes communications software for establishing a conference between the telephone and the list of participants.

DETAILED DESCRIPTION OF PREFERRED EMBODIMENTS

Figure 1:
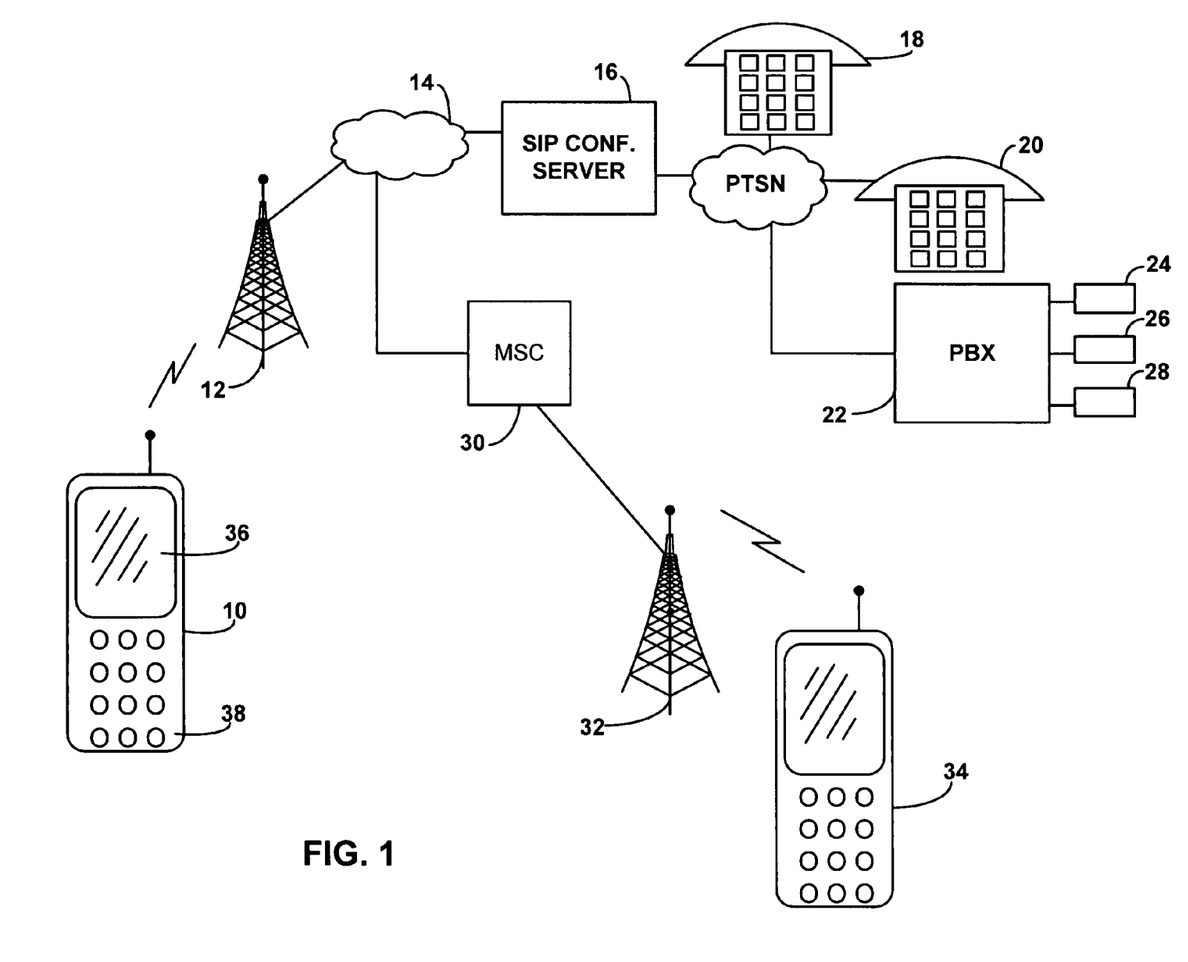
FIG. 1 is an illustration of a representative network environment where the invention can be practiced.

FIG. 1 is an illustration of a representative network environment where the invention can be practiced. A telephone 10, in the illustrated embodiment a cellular telephone, is the device that initiates a real time telephone conference with remotely located participants. The participants could be other wireless telephones or conventional wired (land-line) telephones. The telephone 10 communicates via a cellular base station antenna 12 with elements in a wireless communication service provider network 14, the details of which are not important and are known in the art.

The network 14 includes a real time conference server (e.g., SIP conference server 16) that sets up conferences for the telephone 10 in response to SIP invite messages received from the telephone 10. The SIP conference server 16 may take the form of a general purpose computing platform or workstation (Windows NT server or Sun Microsystems workstation) equipped with SIP conference software and a memory storing information identifying conference groups and members thereof for a plurality of SIP client devices (e.g., phone 10) that are served by the SIP conference server 16. The workstation 16 includes network interfaces to receive SIP invite messages from the SIP clients it services and sends SIP conference initiation messages to conference participants. These details are known in the art and described in the SIP specifications.

To establish such conferences, the SIP conference server 16 sends SIP initiation messages to other telephones, including telephones 18, 20 and 24, 26 and 28, on behalf of telephone 10. In the illustrated example, the telephones 24, 26 and 28 are served by a common switchboard or PBX 22, such as may be the case where the telephones 24, 26 and 28 are extensions at the employer of the user of phone 10 (e.g., members of company management, sales force, etc.). The conference could also include other cellular telephones, such as telephone 34. The telephone 34 receives messages from the SIP conference server via mobile switching center 30, and wireless base station antenna 32. Obviously, the number and type of communications devices that initiate or participate in the conference is not important and the details on particular embodiments of this invention may vary considerably from the illustrated arrangement in FIG. 1.

As shown in FIG. 1, the telephone 10 includes a screen display 36 and buttons 38 forming a user interface to carry out user input features of this invention. The display 36 could be a touch sensitive display. The telephone may also include speech recognition software to allow the user to provide voice commands to provide user input as described below. The manner in which a user selects conference groups, exclusion lists, and logical operators may vary depending on the capabilities of the telephone that is used; the particular details are not particularly important and within the ability of persons skilled in the art. The telephone 10 also includes a processor and memory storing a SIP client application, predefined conference groups, and instructions for carrying out the conference group selection features disclosed herein.

The identity and membership of the predefined conference groups stored in the SIP client application in the telephone 10 are also stored in the SIP conference server 16. Thus, when the user selects a particular conference group it need only send identifying information to the conference server as to the selected group (e.g., conference group "gr1" or "partners"), the conference server 16 refers to a local database to identify the individual members in the groups "gr1" or "partners" for the telephone 10.

First Embodiment

Figure 2:
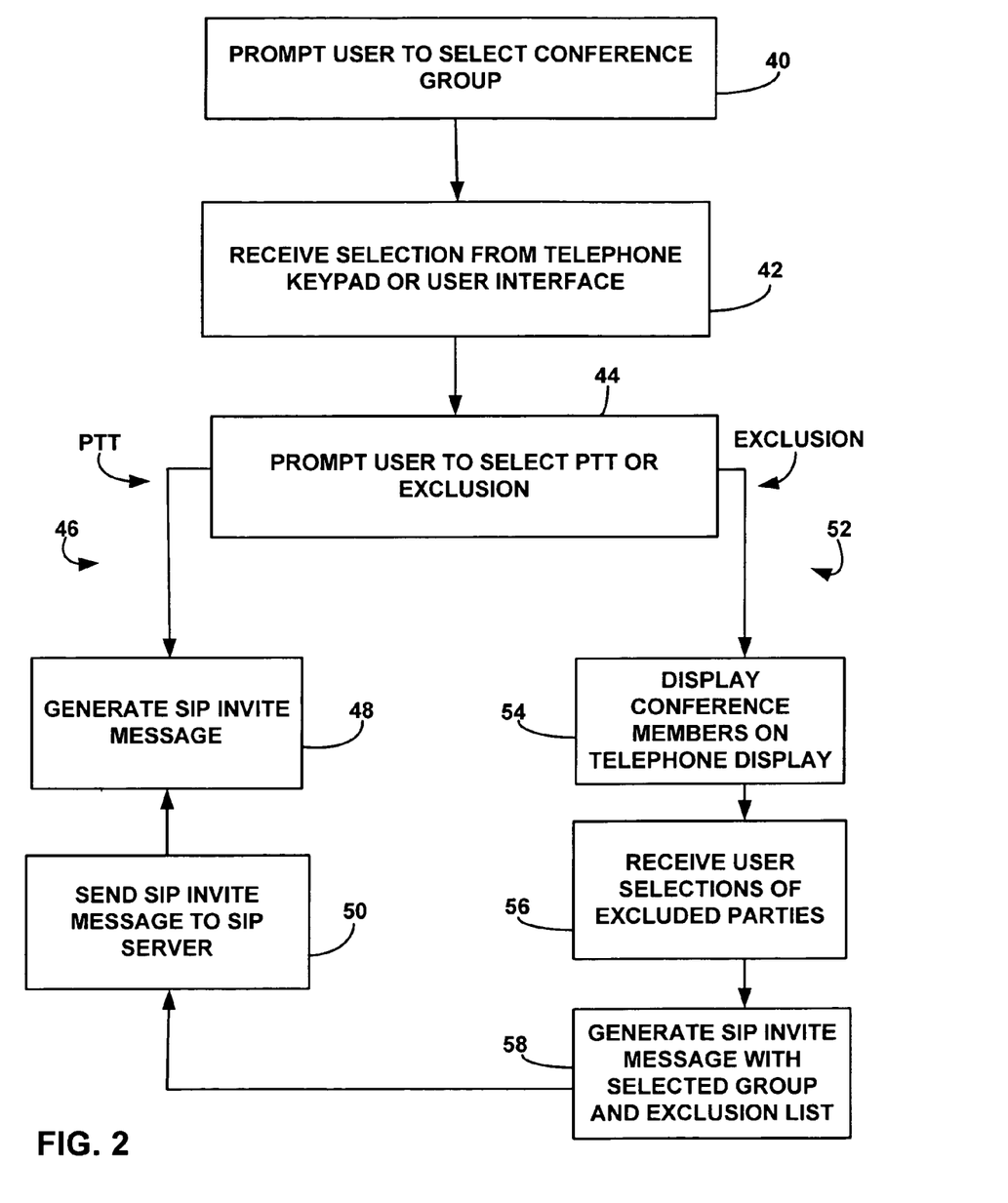
FIG. 2 is a flow-chart of a process of selecting a conference group and initiating a real time conference session with a group of participants using an exclusion list feature.
Figure 3:
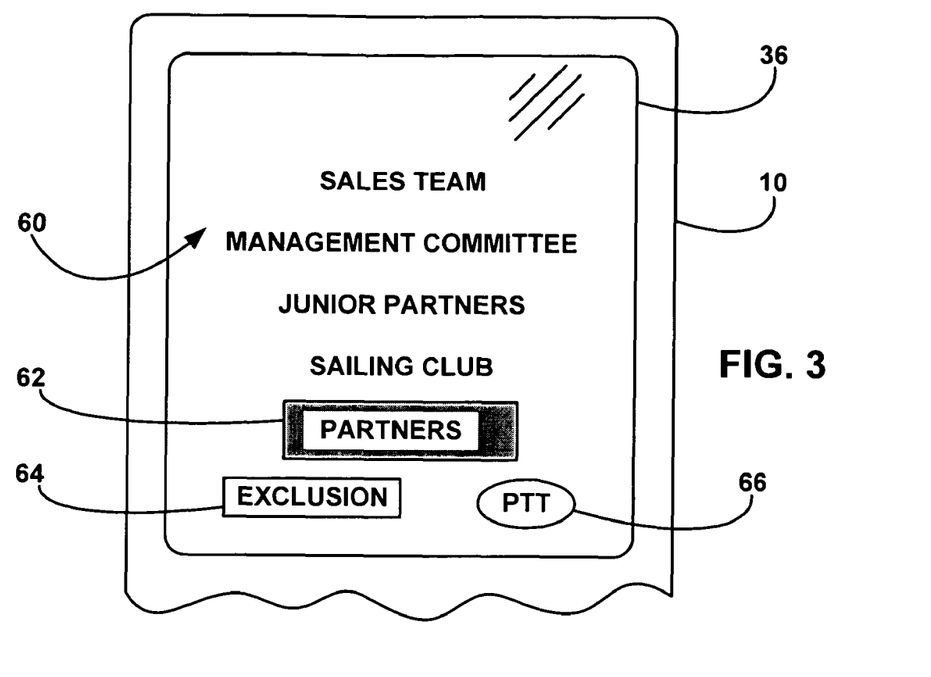
FIGS. 3 and 4 are two representative screen displays that illustrate user interface features on the screen of the telephone initiating the conference using the method of FIG. 2.
Figure 4:
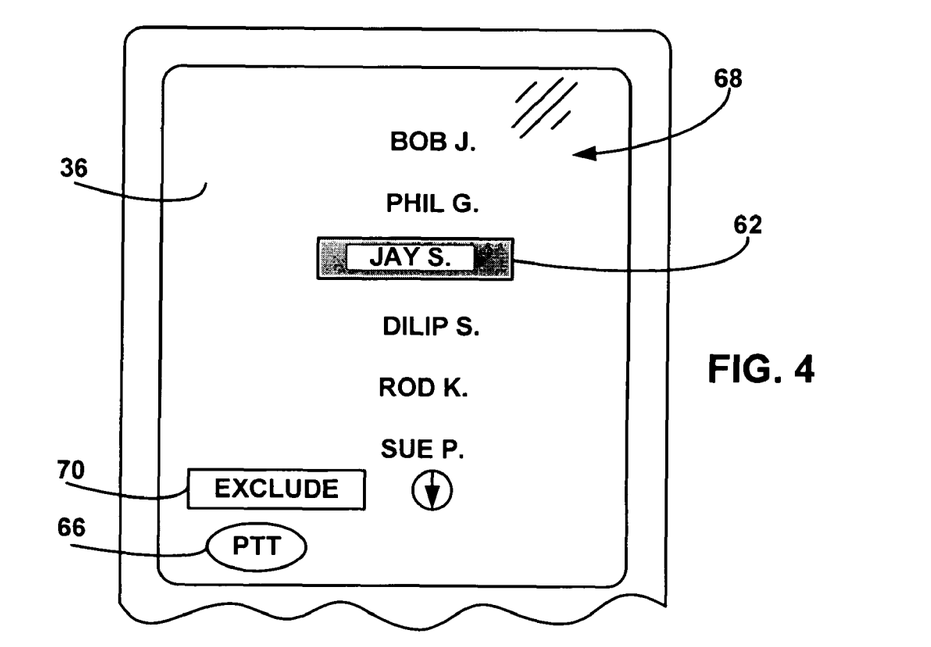

Exclusion Lists (FIGS. 2-4)

In a first embodiment, a user (conference initiator) is provided with the option to select a conference group on the telephone 10 and then select one or more members of the group to be members of an exclusion list, so that the members selected in the exclusion list will be excluded from the conference. In other words, an exclusion list comprising an identification of one or more parties (or, more specifically SIP addresses) to exclude from the conference group is sent to the conference server. The exclusion list is applied to the instant conference only; that is, it does not affect the conference group in subsequent conferences. The invention can be implemented in standard SIP signaling, such as in the SIP INVITE message, by defining a new field "exclusion list" or "exclude", and listing the SIP addresses of the excluded parties in the field.

In a representative embodiment, when the user accesses their SIP application, a screen appears on the display of the station showing the available conference groups, and the user selects the group of persons they wish to include in the conference. For example, the user may select the conference group "Partners." As soon as the Group name is selected by the user, an exclusion and inclusion options menu may appear in the screen. If the "start", Push-to-Talk (PTT) or "initiate" icon or button is pressed on the phone (bypassing the exclusion function), the entire group "Partners" is invited. The call will be made to the whole group and no exclusion will take place. However, the user can exercise the exclusion option by clicking or selecting an "Exclusion" icon. If the Exclusion icon is selected, the list of the members in the group "Partners" is presented. The user can scroll through the list and highlight each name to be excluded and press a hot key (e.g., " "), touch an icon on the screen (if the screen is touch sensitive), or take other user interface action to select the person to be excluded from the group. Multiple members of the group could be excluded if desired. Once the selection process is complete, the user presses the "start" or PTT button to start the conference call.

At this point, the handset SIP client (software resident in telephone 10) will send the group name or i.d. (depending on whether it is a personal or company group), along with the addresses of members selected in the exclusion list. This message can be formatted as a SIP INVITE message that is sent to the SIP conference server 16. At the conference server 16, the group members are fetched and short-listed by rejecting the addresses found in the exclusion list (i.e., the addresses found in the incoming INVITE message in the Exclusion field). The conference server sends INVITE messages to the members in that shortlist only.

An example of a SIP INVITE message with the Exclusion list feature would be as follows:
INVITE sip:partners@sprintpcs.com SIP/2.0
Via: SIP/2.0/UDP pc33.sprintpcs.com; branch=z9hG4BK776askdjs
Max-Forwards: 70
To: partners@ptt.sprintpcs.com
From: Debashis@ptt.sprintpcs.com
Exclude: Tom@ptt.sprintpcs.com; junior_partners@ptt.sprintpcs.com
Call_ID: a84b2c87d39945@debashis@ptt.sprintpcs.com
. . . [other SIP INVITE details omitted]
Here, "partners" is a pre-defined conference group consisting of multiple members, and ptt.sprintpcs.com is the conference server. The exclude list can include a single individual (Tom) in the "partners" group, or a subset of the partners conference group (the subset "junior_partners"). The junior_partners sub-set is resolvable to individual partners of the larger "partners" group. The Exclude field is newly-defined by modification of the SIP INVITE standard message.

While the disclosed embodiment is a SIP embodiment, other communications protocols could be modified using the techniques disclosed herein.

One possible process of using exclusion a list is shown in flow-chart form in FIG. 2. The user of the telephone 10 accesses the SIP conference application resident on the device. Then, at step 40, a screen is displayed on the telephone listing the conference groups and prompting the user to select a group the user wishes to initiate a conference with.

At step 42, the user provides a selection of a conference group using the user interface and the selection is received. The selection could be by touching the screen of the phone, using buttons on the phone, speaking commands, or in some other manner.

At step 44, the user is prompted to either initiate the conference or activate the exclusion feature. If the user selects the PTT, "start" or "conference" button to initiate the conference, the processing branches as indicated at 46. At step 48, the SIP client generates a SIP invite message that includes an identification of the conference group. At step 50 the SIP INVITE message is sent to the SIP server 16 and the conference is established.

If, at step 44, the user activated the exclusion feature (e.g., by speaking "exclusion" or by pressing or activating an exclusion icon, the processing branches as indicated at 52. At step 54, the display of the phone displays the members of the conference group that was selected at step 42. At step 56, the user indicates which members of the group are to be excluded and the selection is received from the user interface. At step 58, a SIP INVITE message is generated that includes the selected conference group and the exclusion list. In the SIP INVITE message, the members that are to be excluded are listed by name, by telephone phone number, by SIP address, by group identification (e.g., exclusion of a sub-group within the selected group) or other equivalent manner. The process then proceeds to step 50 where the SIP INVITE message is sent to the conference server.

FIG. 3 shows one possible screen display at step 42. The screen 36 of the telephone 10 shows a list 60 of the available predefined conference groups for the phone 10. The display includes a highlight feature 62 that shows the current selection. In FIG. 3, the user has selected the group "partners". If they press the PTT button 66, the SIP client generates a SIP INVITE message for the group "partners" and sends it to the SIP conference server 16. The icon "Exclusion" 64 is presented to enable the user to activate the exclusion feature of this embodiment. If Exclusion 64 is pressed, the display of FIG. 4 is shown. The display of FIG. 4 corresponds to step 54 in FIG. 2. The members of the "partners" group is displayed. The user scrolls with the highlight feature 62 the names of the persons they wish to exclude, presses the exclude button 70 (or some hot key on the phone such as #). The selection is stored in memory in the telephone 10. The user then scrolls to any other persons they wish to exclude with the highlight feature and presses the exclude button 70. When they are done identifying members of the exclusion list, the user presses the PTT button 66. The SIP invite message is then generated and sent to the SIP server.

Second Embodiment

Logical Operators to Combine Conference Groups
(FIGS. 5-8)

As Stated Previously, Multiple Discrete, Conference Groups are Previously Defined and stored locally on the telephone 10. The conference groups could be personal groups or corporate groups. The user may wish to initiate a conference with a limited set of the members of one or more groups, or otherwise combine, exclude or group the conference groups in a new, more flexible way to achieve a new conference member list. In this second embodiment, we provide for combining conference (or PTT) groups with logical operators such as 'AND', 'OR', 'NOT', 'XOR' etc. The operation of the logical operator on the groups selected by the user results in a new grouping of conference group members; this new grouping is then used for the call.

Consider for example the following predefined conference groups:
Group 1={user1, user2, user3, user20}
Group 2={user3, user5, user7}
Group 3={user1, user2, user3}
Group 4={user18, user19, user20}
The elements in the above groups (e.g., user1, user2 etc.) are the group members.

After selecting a conference group (e.g., Group 1) in initiating a PTT call, the user is provided with the option to press the PTT button to initiate the conference, or to choose a logical operator by pressing one or more keys on the phone previously assigned to a specific logical operator (e.g., press for OR, '#' for AND, '0' for NOT and '**' for XOR). If the user selects a logical operator, the user is prompted to select either another conference group or an individual. After the selection is made, the user is again given the option to press the PTT button to initiate the conference or to select another logical operator in the same way. Preferably, there is a limit to the number of logical operators that can be used for a given conference, such as 3 or 4.

Consider for example the user selects Group 2, then the logical operator OR and then selects Group 3 (the members of the groups as defined above). The resulting conference selection for Gr2 OR Gr3={user1, user2, user3, user5, user7}. Thus, the OR operator selects as members for the conference those individuals that are members of either the first group selected or the second group selected, or both.

Consider for example the user selecting Group 2, the AND operator, and Group 3. The resulting conference selection of Gr2 AND Gr3={user3}. Thus, the AND operator selects those members of the first group that are also members of the second group.

Consider for example the user selecting Group 1, the NOT operator, and Group 4. The resulting conference selection of Gr1 NOT Gr4={user1, user 2, ... user17}. Thus, the NOT operator acts to exclude the members of the first group that are in the second group selected.

Consider for example the user selecting Group 2, the XOR operator, and Group 3. The resulting conference selection of Gr2 XOR Gr3={user 1, user 2, user 5, user 7}. Here, the XOR operator operates to exclude the results of Gr 2 AND Gr 3 (i.e., member 3), from the results of Gr 2 OR Gr 3. As another example, if the user selects Group 1, the XOR operator, and Group 4, the result of Gr 1 XOR Gr 4={user 1, user 2, user 3, ... user 17}. Incidentally, this gives the same result as GR 1 NOT Gr 4.

It is possible to use more than one operator in a single call setup. The logical operators in the sequence will get preference from right hand side. That is, the right-most operator (that is, the last one entered by the user) one will be executed first, then the second one from right and so on, moving from right to left. Thus, for example, if the user enters Gr4 AND G2, and then selects NOT and Gr3, the software will perform the operation G2 NOT G3, and then perform Gr4 AND the result of the Gr2 NOT G3 operation. For the grouping defined above, Gr4 AND Gr2 NOT Gr3={user5, user7, user18, user19, user20}

Once the group combination is done via the operators, the client station (conference initiator) will send the PTT group names or ids (depending on personal or company group) along with the operators, maintaining the sequence in which they are entered, delimited with a space, via a SIP Invite message to the PTT or conference server 16. At the PTT server 16, the members of each group are fetched and the logical operations are applied to arrive at the resulting member list ("shortlist"). The PTT server then sends as SIP Invite message to the members in that shortlist only.

In an alternative embodiment, the logical operation(s) could be applied to the PTT groups using executable logic started locally on the client station initiating the conference. The resulting SIP invitation message would list the individual participants to include in the conference. This embodiment distributes the processing burden onto the devices functioning as conference initiators.

Figure 5:
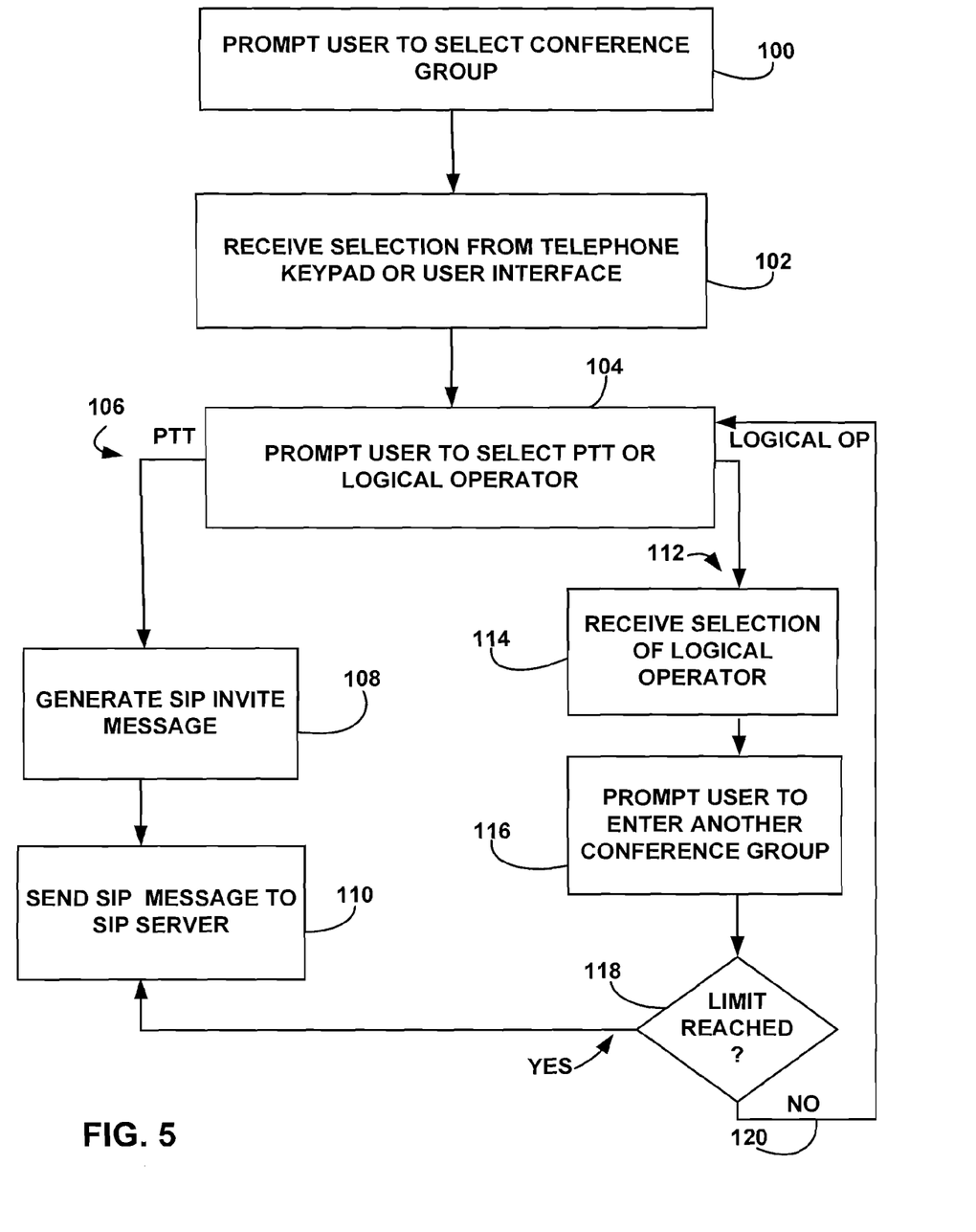
FIG. 5 is a flow-chart of a process of selecting a conference group and initiating a real time conference session with a group of participants using a logical operator feature.

An embodiment of this variation of the invention is shown in flow chart form in FIG. 5. The user of the phone 10 activates the conference application and then at step 100 a display of available conference groups is displayed on the screen and the user is prompted to select a conference group.

At step 102, the user makes a selection and the selection is received and stored by the SIP client application.

At step 104, the user is prompted to either initiate the conference (by pressing a PTT or Start button or icon) or to select a logical operator. If, at step 104, the user presses PTT, the process proceeds to branch 106. At step 108 the SIP INVITE message is generated and at step 110 sent to the SIP server 16.

If, at step 104, the user selected the logical operator feature, the processing proceeds to branch 112. At step 114, a logical operator is selected by the user and the selection is received by the SIP client application. At step 116, the user is prompted to enter another conference group. At step 118, a check is made to determine whether the user has exceeded the number of permissible logical operators. If the limit has not been exceeded, the processing loops back as indicated at step 120 to step 104 and the user is prompted to either initiate the call or go through the logical operator steps 114, 116 and 118. Thus, as shown in FIG. 5, multiple logical operators and conference groups can be selected in a preferred embodiment.

Figure 6:
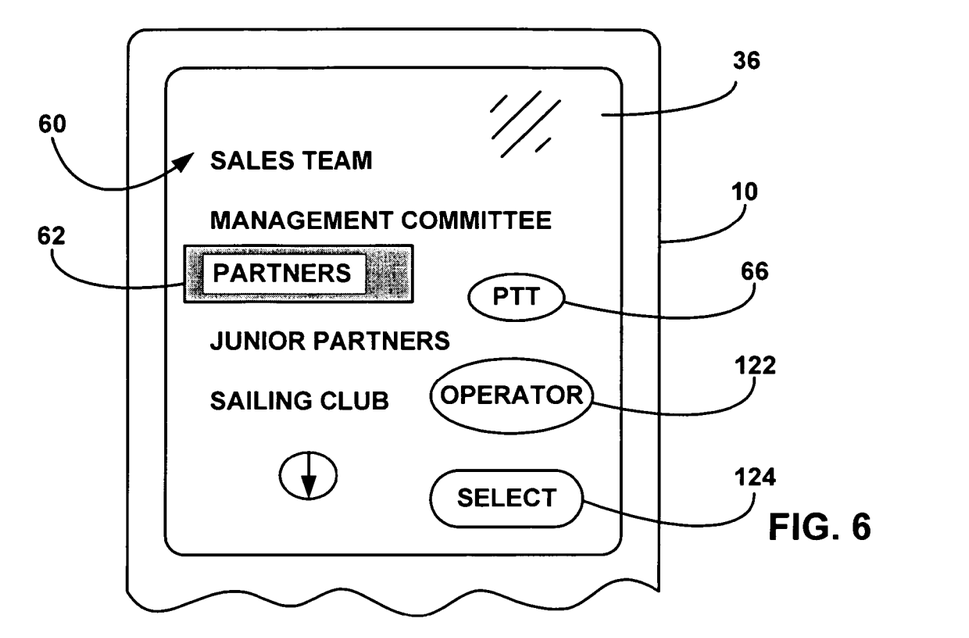
FIGS. 6-8 are representative screen displays that illustrate user interface features on the screen of the telephone initiating the conference using the method of FIG. 5.
Figure 7:
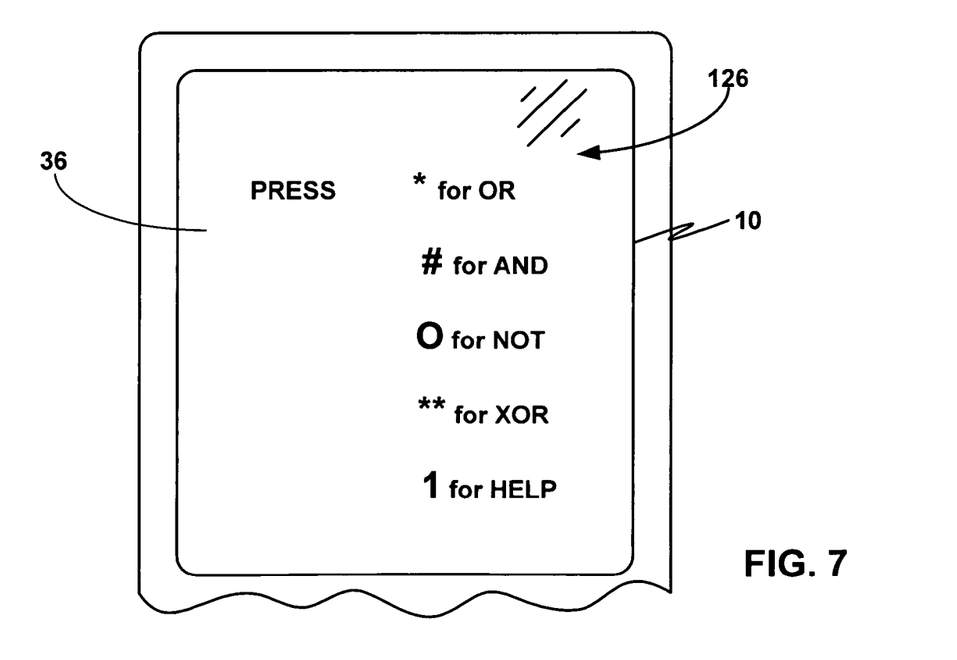
Figure 8:
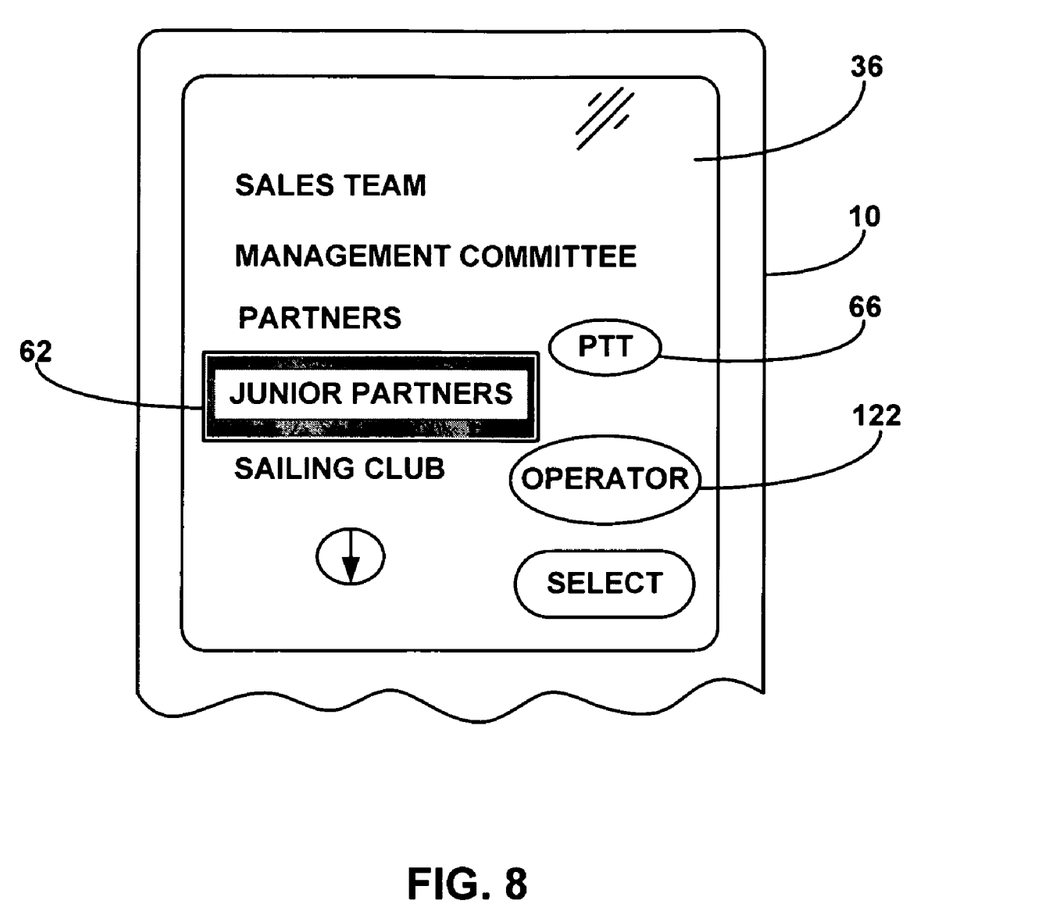

FIG. 6 shows a representative screen display for step 104. The display 36 shows a list 60 of the available conference groups. The user uses the highlight feature 62 and scrolling functionality to select the conference group. The user can indicate their selection by activating a select icon 124. The user then either selects the PTT icon 66 to initiate the conference, or the operator icon 122 if they wish to use the logical operator feature. If they select the operator icon 122, the display 126 appears (corresponding to step 114 of FIG. 5). The user is shown a list of the available operators and the buttons that are associated with each operator. When the use selects the desired operator, the display of FIG. 8 appears (corresponding to step 116 of FIG. 5). The user is prompted to enter a selection of another group to go with their previous selection of a group and an operator and then select PTT 66 or operator 122 depending on whether they wish to start the conference or enter another operator and conference group as shown in FIG. 5.

As noted above, the invention is applicable to telephones generally, but is particularly useful with cellular phones.

From the foregoing, it will be appreciated that in one possible embodiment of the invention a conference server is provided for real-time conferencing. The conference server (such as SIP conference server 16 in FIG. 1) includes an interface receiving an invitation message from a telephone 10. The invitation message (such as a SIP INVITE message) includes a selection of a plurality of predetermined conference groups and at least one logical operator to be applied to the selection of conference groups. The conference server further includes executable logic for operating on the selection of conference groups using the at least one logical operator to thereby create a desired shortlist based on the selection of conference groups and the logical operator for the conference. The desired shortlist comprises a list of participants for the conference. The conference server further includes communications software, such as conventional SIP software in compliance with RFC 3261 for establishing a conference between the telephone and the list of participants.

Also, the process for one telephone 10 of FIG. 1 will be expected to be performed in parallel for a multitude of SIP client devices serviced by the conference server 16. As such, a plurality of distributed SIP conference servers 16 may be needed over a wide area to serve all of the SIP client devices using this service.

While presently preferred embodiments have been disclosed, variations are possible within the scope of the invention. The user interface details shown in FIGS. 3, 4, 6, 7, 8 are offered by way of illustration and not limitation and other arrangements (including hard keys or other features on the telephone) could be used to receive user selection of conference groups, operators, and exclusion lists. The true scope is to be determined by reference to the appended claims.

The invention claimed is:

1. A method of initiating a real-time conference between a telephone device operated by conference initiator and a remotely located participant, comprising the steps of:
    generating, at the telephone device, an invitation message, wherein said invitation message identifies a group of one or more participants to participate in the conference, and
    including in the invitation message an exclusion list comprising an identification of one or more of said participants of the group to be excluded from the conference, and
    transmitting the invitation message from the telephone device to a conference server, said conference server responsively initiating said conference with the group of one or more participants minus the participants in said exclusion list.

2. The method of claim 1, wherein the exclusion list identifies individual members in said group.

3. The method of claim 2, wherein the exclusion list identifies a sub-set group of members in said group.

4. The method of claim 1, wherein said invitation message comprises a Session Initiation Protocol (SIP) INVITE message.

5. The method of claim 1, wherein the method is implemented in a cellular telephone.

6. In a telephone providing for real-time conferencing with a group of participants, the improvement comprising:
    providing in said telephone a machine-readable memory storing software instructions for generating a conference invitation message for initiation of a conference, wherein the conference invitation message comprises a) an identification of a predetermined group of participants to participate in the conference and b) an exclusion list identifying at least one member of the group to be excluded from the conference.

7. The improvement of claim 6, wherein the telephone comprises a cellular telephone.

8. The improvement of claim 6, wherein said telephone includes an interactive conference initiation application and wherein said application causes a screen to display the members of the group selected for the conference and enabling a user to select individual members of the group to be excluded from the conference.

9. The improvement of claim 6, wherein said conference invitation message comprises a Session Initiation Protocol (SIP) INVITE message.

* * * * *